Figure 1:
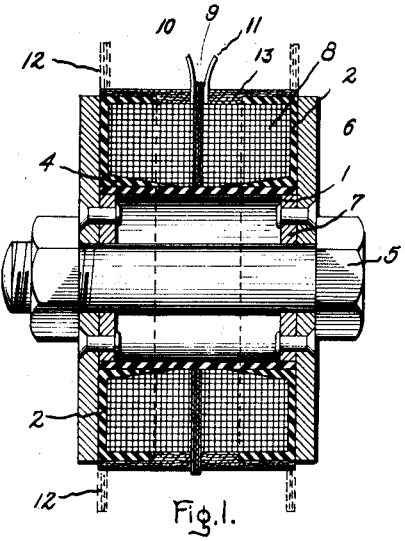

Feb. 26, 1924.  
C. F. PETERSON  
1,485,289  
ELECTRIC COIL AND METHOD OF MAKING SAME  
Filed April 20, 1922

Inventor:  
Charles F. Peterson,  
by *Albudy Davis*  
His Attorney

Patented Feb. 26, 1924.

1,485,289

UNITED STATES PATENT OFFICE.

CHARLES F. PETERSON, OF SCHENECTADY, NEW YORK, ASSIGNOR TO GENERAL ELECTRIC COMPANY, A CORPORATION OF NEW YORK.

ELECTRIC COIL AND METHOD OF MAKING SAME.

Application filed April 20, 1922. Serial No. 555,669.

*To all whom it may concern:*

Be it known that I, CHARLES F. PETERSON, a citizen of the United States, residing at Schenectady, county of Schenectady, State of New York, have invented certain new and useful Improvements in Electric Coils and Methods of Making Same, of which the following is a specification.

The present invention relates to coils of electric conductor wire for magnets and other inductive apparatus and to methods for making them.

The object of my invention is to provide an improved electrical coil capable of sustaining very rough usage without injury, which shall be impervious to moisture and oil, which for a given volume and size of wire will have a maximum number of turns or convolutions, and which may be manufactured at low cost.

It has been customary heretofore in making electrical coils intended to withstand rough usage and vibrations to wind the insulated conductor wire upon rigid spools having heads to support and protect the ends of the wire coil. The best grade of such spools have been made of several thicknesses of fabric saturated with liquid insulation such as phenolythic resin and shaped under pressure in steel molds, and while held in the molds subjected to high heat treatment for some hours to polymerize the phenolythic condensation product. Each set of molds was necessarily expensive and could be used in the making of only a very few spools in a day's time. Accordingly it was necessary in the manufacture of each particular size of spool in quantity to employ a large number of molds. Moreover in use these high grade spools were not uniformly satisfactory, for it is necessary that electrical coils for certain uses be waterproofed, and where, as sometimes happens, the spool ends warped or sprung away from the wire coil, cracks were formed in the waterproofing coating which permitted water and oil to gain access to the wire and its insulation.

According to my invention, I assemble several layers of fabric saturated with some liquid resin on a suitable center or hub to form a species of limp spool and mount it between two plain metal disks held together by a bolt passing through the hub, and on the limp spool thus supported I wind the insulated conductor wire compactly and so as to crowd the spool ends against the supporting disks. After the desired number of turns have been wound the edges of the saturated fabric are flanged over and pressed down upon the wire bundle and the flanges at the opposite ends of the coil are connected by similarly saturated taps wound thereon and upon the exposed portion of the coiled wire to effectually complete its encasement and to produce a neat appearance in the complete coil. The wound bundle of wire encased in its saturated fabric and rigidly clamped by its metal support is transferred to an oven where it is subjected to a high degree of heat for a sufficiently long period to polymerize or convert the resin into a horny insoluble substance which with its reinforcements of fabric provides a tough jointless encasement or shell about the wire bundle which is capable of withstanding any amount of rough usage. The coils thus formed are ready for most uses upon detaching the metal supports therefrom, but in order to make doubly sure of their resistivity to the entrance of moisture and oil they are upon removal from the oven and while hot dipped in cold varnish and dried.

Figure 2:
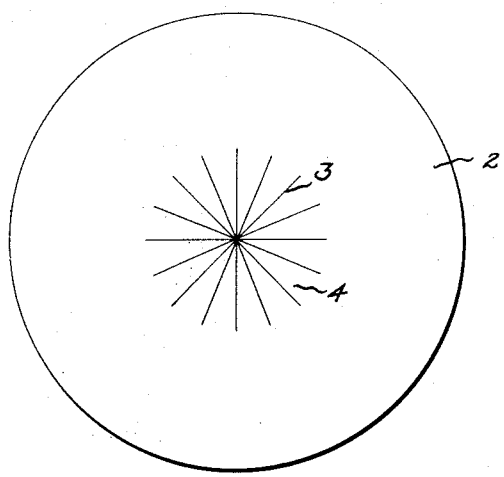

I have shown one form of the invention in the accompanying drawing in which Fig. 1 is an axial section of a completely formed electric coil mounted on its metal support, and Fig. 2 is an outline of a fabric blank of an end layer.

The tube 1 is of cured treated fabric and has a length equal to length of the electrical coil to be formed. A number of blanks 2 of fabric soaked in liquid resin and provided with cross slits 3 at the center to form triangular tangs 4 as shown in Fig. 2 are forced over the ends of the tube 1 with the tangs directed inward and there pasted with liquid resin.

The metal support comprises an ordinary bolt 5 having threaded thereon two steel washers or end plates 6 having riveted to their inner surfaces concentric washers 7 of a size to enter the bore of the tube 1 and hold it centered relative to the end plates 6.

The metal support with its limp spool is now ready for mounting in a lathe or winding machine after which it is tightly wound with insulated conductor wire 8. I prefer to use enamelled or coated wire, but of course any form of insulated wire may be used. I also prefer to divide the length of the coil by a central transverse insulating barrier 9, thus in effect forming two coils joined at their inner ends across the barrier and with the outer ends or terminals 10 and 11 of the two coils extending outwardly on opposite sides of the periphery of the barrier.

The diameter of the blanks 2 will be made somewhat larger than the diameter of the final coil so that there will be a narrow zone 12 at the periphery of each blank for flanging over the outer layer of wire where they are pressed down smoothly and firmly united by windings of tape 13 soaked with liquid resin and encasing the periphery of the coil.

The number of layers of fabric employed in each end portion will depend upon the size of coil and the character of service to which it will be subjected, but on account of the end portions 2, after the complete coil has been heat cured, having rigid faces and flanges peripherally held by the integrally united layer of tape, the thickness thereof may be materially less than in the best grades of spools heretofore in use for similar service.

While I have described and illustrated the best embodiment of the invention now known to me, I do not desire to be restricted thereto.

What I claim as new and desire to secure by Letters Patent of the United States, is,—

1. An electric coil comprising a bundle of compactly wound conductor wire encased in a shell of polymerized resin and incorporated reenforcing fabric.

2. An electric coil comprising a bundle of compactly wound insulated conductor wire encased in a shell of polymerized phenolythic resin and incorporated reenforcing fabric.

3. An electric coil comprising a bundle of compactly wound insulated conductor wire totally encased in a jointless shell of polymerized phenolythic resin and incorporated reenforcing fabric.

4. An electric coil comprising a bundle of compactly wound insulated conductor wire encased in a shell of polymerized resin and incorporated reenforcing fabric and coated with a moisture and oil-proof material.

5. The method of making an electric coil comprising the mounting on a metal form of a limp spool composed of layers of fabric saturated in liquid resin, winding of a bundle of insulated wire compactly on said rigidly supported limp spool, tightly winding tape saturated in liquid resin about the edges of the limp spool and the outer winding of said wire, and subjecting the coil thus formed and while supported by its metal form to high heat to polymerize the resin.

6. The method of making an electric coil comprising the mounting of fabric disks saturated with liquid resin on a tube to form a limp spool, mounting said spool between rigid metal plates, winding a bundle of insulated conductor wire tightly and compactly on said spool, flanging the fabric disks over the wire bundle, winding tape saturated with liquid resin over said wire bundle and the flanges of said fabric disks, and subjecting the whole to high heat to polymerize the resin.

In witness whereof I have hereunto set my hand this 19th day of April, 1922.

CHARLES F. PETERSON.